(12) United States Patent
Farrugia et al.

(10) Patent No.: US 9,580,578 B2
(45) Date of Patent: Feb. 28, 2017

(54) LATEX COMPRISING COLORANT AND METHODS OF MAKING THE SAME

(71) Applicant: XEROX CORPORATION, Norwalk, CT (US)

(72) Inventors: Valerie M. Farrugia, Oakville (CA); Mihaela Maria Birau, Hamilton (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/875,131

(22) Filed: Oct. 5, 2015

(65) Prior Publication Data

US 2016/0024276 A1 Jan. 28, 2016

Related U.S. Application Data

(62) Division of application No. 13/949,195, filed on Jul. 23, 2013, now Pat. No. 9,213,248.

(51) Int. Cl.
| | |
|---|---|
| G03G 9/00 | (2006.01) |
| C08K 5/42 | (2006.01) |
| G03G 9/08 | (2006.01) |
| G03G 9/087 | (2006.01) |
| G03G 9/09 | (2006.01) |
| G03G 9/093 | (2006.01) |
| C08K 5/3417 | (2006.01) |

(52) U.S. Cl.
CPC ............... *C08K 5/42* (2013.01); *C08K 5/3417* (2013.01); *G03G 9/0806* (2013.01); *G03G 9/0812* (2013.01); *G03G 9/0819* (2013.01); *G03G 9/0827* (2013.01); *G03G 9/08706* (2013.01); *G03G 9/08708* (2013.01); *G03G 9/08711* (2013.01); *G03G 9/08722* (2013.01); *G03G 9/08728* (2013.01); *G03G 9/08731* (2013.01); *G03G 9/08737* (2013.01); *G03G 9/0912* (2013.01); *G03G 9/09321* (2013.01); *G03G 9/09364* (2013.01); *G03G 9/09378* (2013.01); *G03G 9/09392* (2013.01)

(58) Field of Classification Search
CPC .. G03G 9/0912; G03G 9/0935; G03G 9/0819; G03G 9/0827; G03G 9/08711; G03G 9/0975

See application file for complete search history.

(56) References Cited

U.S. PATENT DOCUMENTS

| | | |
|---|---|---|
| 3,590,000 A | 6/1971 | Palermiti et al. |
| 3,655,374 A | 4/1972 | Palermiti et al. |
| 3,720,617 A | 3/1973 | Chatterji et al. |
| 3,983,045 A | 9/1976 | Jugle et al. |
| 6,004,714 A | 12/1999 | Ciccarelli et al. |
| 6,190,815 B1 | 2/2001 | Ciccarelli et al. |
| 6,218,067 B1 * | 4/2001 | Belmont ............... G03G 9/0904 430/108.3 |
| 2011/0008722 A1 * | 1/2011 | Wosnick ............... G03G 9/0802 430/108.6 |

* cited by examiner

*Primary Examiner* — Thorl Chea

(74) *Attorney, Agent, or Firm* — Pillsbury Winthrop Shaw Pittman LLP

(57) ABSTRACT

A process includes forming an emulsion comprising a monomer and a colorant, the colorant further including an anionic functional group and a lipophilic counter ion, and polymerizing the monomer to form a latex, the latex includes polymer nanoparticles having the colorant dispersed therein.

7 Claims, 1 Drawing Sheet

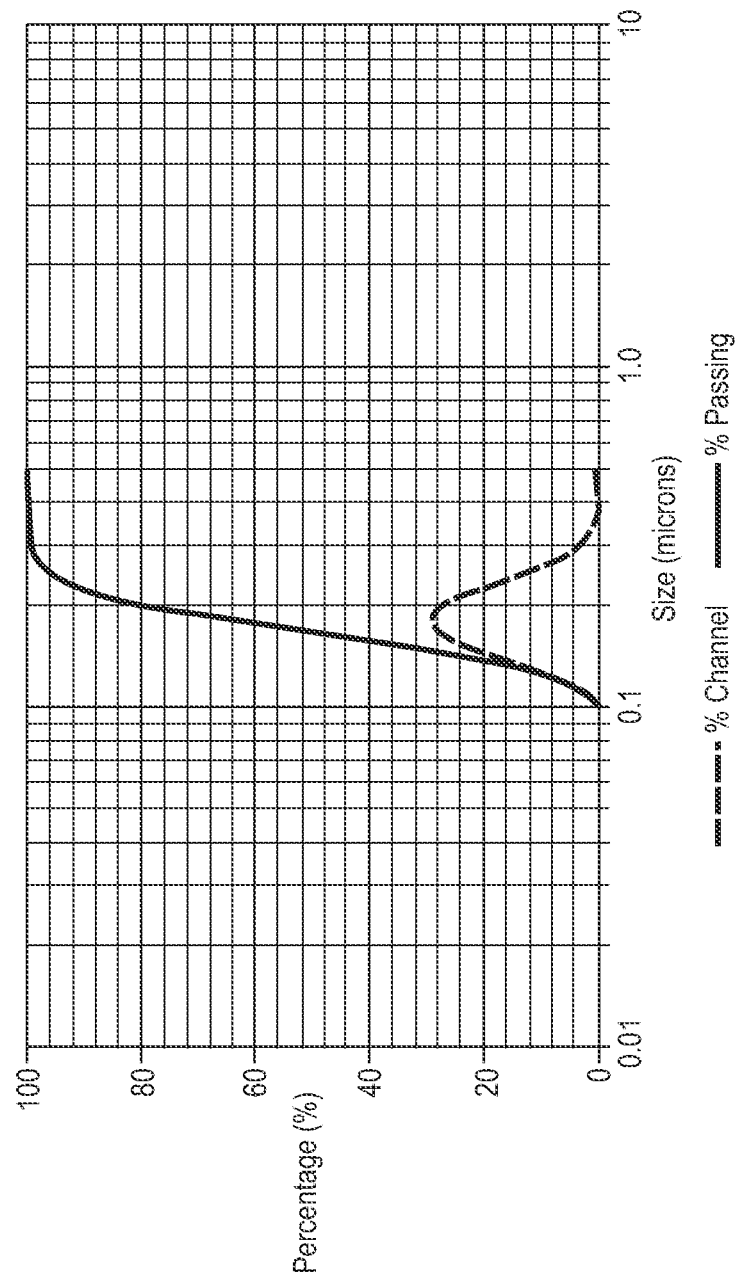

LATEX COMPRISING COLORANT AND METHODS OF MAKING THE SAME

CROSS REFERENCE TO RELATED APPLICATION

This application is a division of, and claims the benefit of priority to, U.S. patent application Ser. No. 13/949,195, filed Jul. 23, 2013, the entire contents of which is incorporated herein by reference.

BACKGROUND

Embodiments disclosed herein relate to latexes used in the manufacture of toner particles. More particularly, embodiments disclosed herein relate to processes and compositions used for integrating optionally modified colorants into the matrix of polymer particles in a latex.

Colorants, such as dyes and pigments, employed in toner particle synthesis are typically added during the aggregation and coalescence (EA/coalescence) of a latex comprising toner particles. Natural pigments, such as indigo, are potentially useful colorants but are often difficult to disperse due to their large particle size and lack of functionality. These characteristics may also make dispersant attachment to the pigment particle challenging.

BRIEF DESCRIPTION OF THE FIGURES

FIG. 1 is a plot showing particle size distribution of latex particles prepared in accordance with embodiments disclosed herein.

SUMMARY

In some aspects, embodiments disclosed herein relate to processes comprising forming an emulsion comprising a monomer and a colorant, the colorant further comprising an anionic functional group and a lipophilic counter ion, and polymerizing the monomer to form a latex, the latex comprising polymer nanoparticles having the colorant dispersed therein.

In some aspects, embodiments disclosed herein relate to processes comprising forming an emulsion comprising an acrylate monomer, a styrene monomer, and a colorant comprising a sulfate group and a long chain aliphatic quaternary ammonium counterion, co-polymerizing the acrylate and styrene monomers to form a latex, the latex comprising styrene-acrylate co-polymer nanoparticles having the colorant dispersed therein.

In some aspects, embodiments disclosed herein relate to latexes comprising copolymer nanoparticles having a colorant comprising an anionic functional group and a lipophilic counter ion dispersed within a matrix of the copolymer nanoparticles.

DETAILED DESCRIPTION

Embodiments disclosed herein provide latex emulsions comprising polymer particles having a colorant or modified colorant dispersed within the polymer matrix. The latex emulsions may be used in the preparation of toner particles having colorants efficiently dispersed therein, and obviate the need to introduce the colorants as dispersions during aggregation/coalescence. Toner particles prepared from the colorant-containing latexes disclosed herein may provide an overall improved distribution of colorant throughout the final toner particles. Methods are provided for the preparation of colorant-containing polymer particles as part of a latex by forming the polymer from a monomer emulsion in the presence of any desired colorants. Without being bound by a particular mechansim, it is believed that the colorants may be encapsulated by the nascent polymer matrix and/or the colorants may be adsorbed into the latex particles once they are formed during the polymerization step. By way of example, a pigment-based colorant may be polymer coated during an emulsion polymerization process using a semi-continuous feed maintaining monomer-starved conditions. As will be appreciated by those skilled in the art, the addition of colorants to the polymerization may change the monomer partitioning as well as the free radical polymerization kinetics of the reaction which may alter the concentration of surfactant and monomer employed during polymerization.

The colorant itself may be modified covalently or by ion-exchange with an amine or quaternary ammonium based cationic surfactant prior to doping into monomer feed. Without being bound by theory, it is postulated that modification of a colorant with a cationic surfactant, for example, may help in suspending the resultant modified colorant in the monomer solution prior to polymerization, thereby increasing the probability of monomer coating onto each of the individual colorant particles. Methods disclosed herein provide nanosized latex particles which are readily produced with reduced amounts of surfactant when the colorant is modified with amine or quaternary ammonium based cationic surfactant. By way of example, the modification of an indigo pigment bearing an exchangeable cation can be accomplished by ion exchange of the pigment with a long chain alkyl quaternary ammonium salt which also may help reduce the particle size of the pigment. The hydrophobic nature of the long chain alkyl group around the colorant particle may also enhance polymerization at the colorant surface. Advantageously, modified-colorants disclosed herein may be readily dispersed avoiding the need for ultrasonic agitation in forming the dispersion. Thus, a fine organic dispersion of modified-colorant in monomer may be achieved with a simple overhead stirrer and/or centrifugal stirrer with no problems arising from sedimentation or agglomeration of colorant particles.

The colorant-containing latex particles disclosed herein may be prepared by incorporating one or more colorants into the monomer feed that is used to form the initial seed at the outset of latex production using conventional emulsion polymerization under starve-fed conditions. Starve-fed emulsion polymerization may be carried out with a total solids content in a range from about 10 to about 60 percent by weight of the total emulsion mixture. The colorant-monomer feed is thus metered into the seeded aqueous medium to provide nanosized generally monodisperse polymer particles. It will be appreciated that for toner applications, monodisperse polymer particles may be particularly useful, however, the polymerization conditions may be altered to provide other particle size distributions as needed, such as polydisperse, bidisperse, and the like. Methods disclosed herein can be used to synthesize colorant-laden polymer particles with a diameter of up to about 200 nm or less in one step, although access to larger particles is possible. Latex particles may be readily synthesized that have characteristics of good light stability, bright color and narrow particle size distribution. Moreover, incorporation of modified-colorants in the latexes disclosed herein can be accomplished with minimal reactor fouling. In embodiments, an increased amount of colorant can be used to provide darker colors, while higher colorant loading may further allow for reduced amounts of surfactant doping.

Methods disclosed herein are not limited to the production of latexes in connection with EA toner manufacture. The latexes disclosed herein can also be used in preparing water-based paints, coatings, cosmetic and health/beauty aid products as well. These and other advantages will be recognized by those skilled in the art.

In embodiments, there are provided processes comprising forming an emulsion comprising a monomer and a colorant comprising an anionic functional group and a lipophilic counter ion, polymerizing the monomer to form a latex, the latex comprising polymer nanoparticles having the colorant dispersed therein. In embodiments, forming the latex may comprise a starve-fed polymerization.

As used herein, "emulsion" refers to a colloidal system in which fine droplets of one liquid are dispersed in another liquid phase where the two liquid phases are substantially mutually immiscible.

As used herein, "monomer" is used in accordance with its normal meaning in polymer chemistry as a subunit of a polymer. The term is intended to encompass one or more monomers that make up a polymer used to form a latex.

As used herein, "colorant" refers to both natural and synthetic dyes and pigments. In accordance with embodiments, the colorants may be "modified." When a colorant is modified, it has been chemically altered either by ion exchange or by covalent attachment of a functional moiety on the dye or pigment. In particular embodiments, modified colorants are modified by introduction of a charge carrying lipophilic group.

As used herein, "anionic functional" group means an organic functional group capable of supporting a negative charge. For example, a carboxyl group may be ionized to provide a negatively charged carboxylate. Other anionic functional groups include, without limitation, sulfates, sulfonates, sulfinates, phosphates, and the like.

As used herein, "lipophilic counter ion" refers to any cation or anion having substantial hydrophobic character as would be conferred by the presence of alkyl functional groups, especially one or more long chain alkyl functional groups. Long chain alkyl groups may include at least 6 carbon atoms, or at least 8 carbon atoms, or at least 10 carbon atoms. Exemplary lipophilic counter ions include quaternary tetraalkylamines bearing a net formal charge on nitrogen of +1. In accordance with embodiments disclosed herein, the lipophilic counterions may be introduced by way of ion exchange of metal ions.

As used herein, "latex" refers to a liquid having polymeric resin particles dispersed therein. Latexes may be prepared directly from emulsion polymerization reactions.

As used herein, "nanoparticle" refers to particulate species having an effective average diameter of about 900 nm or less, or about 700 nm or less, or about 500 nm or less. Nanoparticles need not be perfectly spherical in nature, although they may be substantially spherical.

In embodiments, the polymer nanoparticles have an average diameter in a range from about 50 nm to about 800 nm, or about 100 nm to about 400 nm, or about 140 nm to about 200 nm. Other particle size ranges and degrees monodispersity or polydispersity may be accessible by varying the polymerization conditions, as would be appreciated by those skilled in the art. In embodiments, the average diameter range may be less than 50 nm, including from about 20 nm to about 50 nm. Likewise, average diameters may also be in a range that exceeds 800 nm, such as about 800 to about 1000 nm. Those skilled in the art will recognize that any desired range of average particle diameters may be accessible by varying the emulsion polymerization conditions and that other ranges may be suitable for purposes other than the manufacture of toner particles.

In particular embodiments, there are provided processes comprising forming an emulsion comprising an acrylate monomer, a styrene monomer, and a colorant comprising a sulfate group and a long chain aliphatic quaternary ammonium counterion, forming a latex from the emulsion, the latex comprising styrene-acrylate co-polymer nanoparticles having the colorant dispersed therein. In some such embodiments, a ratio of styrene to acrylate is in a range from about 40:60 to 98:2.

In embodiments, the colorant employed in processes disclosed herein comprises a modified pigment that is an indigo selected from indigo, isoindigo, indirubin, isoindirubin, 4,4'-dibromo indigo, 6,6'-dibromo indigo, 5,5'-dibromo indigo, cis-6,6'-dibromo indigo, 5,5',7,7'-tetrabromo indigo, 4,4',7,7'-tetrachloro indigo, 3H-indol-3-one, 1,2-dihydro-2-(3-oxobenzo [b] thien-2-(3H)-ylidene), thioindigo, Vat Red 1, cis-thioindigo, 6,6'-dichloro-4,4'-dimethylindigo, 5,5'-dichloro-7,7'-dimethylindigo, 4,4'-7,7'-tétraméthylindigo, thioindigo Scarlet R, the 2H-indol-2-one, 1,3-dihydro-3-(3-oxobenzo [b] thien-2 (3H)-ylidene)-(3E)-, thioindirubine, 2H-indol-2-one, 1,3-dihydro-3-(2-oxobenzo [b] thiophen-3 (2H)-ylidene), benzo [b] thiophen-2(3H)-one, 3-(2-oxobenzo [b] thiophen-3 (2H)-ylidene, Indigo Russig's Blue, Diosindigo the A, B Diosindigo, 4,4'-diethoxy-2,2'-binaphtylidén-I, 1'-dione, 4,4'-bis (hexyloxy)-IH, 14H-2.2'-binaphthalene-1,1'-dione, mamegakinone, biramentaceone, and combinations thereof. A summary of these and other indigos are shown in Table 1 below.

TABLE 1

| Indigo | |
|---|---|
| | 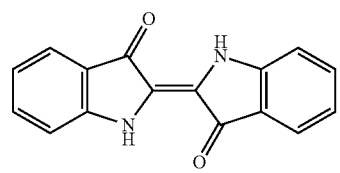 [SMILES: O=C1/C(=C2\Nc3ccccc3C2=O)Nc2ccccc21] |

TABLE 1-continued
Isoindigo
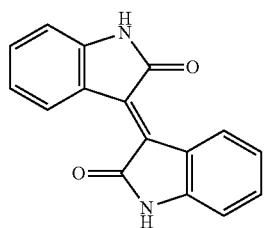 [SMILES: O=C1Nc2ccccc2/C1=C1\C(=O)Nc2ccccc21]
Indirubine
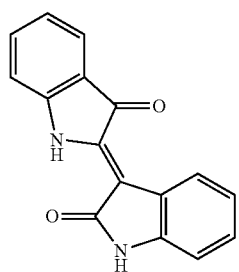 [SMILES: O=C1Nc2ccccc2/C1=C1/Nc2ccccc2C1=O]
Isoindirubine
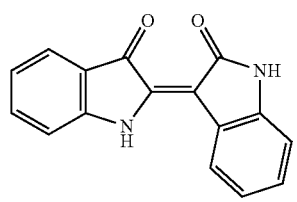 [SMILES: O=C1Nc2ccccc2/C1=C1\Nc2ccccc2C1=O]
4,4'-dibromo indigo
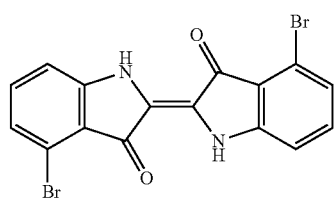 [SMILES: O=C1/C(=C2\Nc3cccc(Br)c3C2=O)Nc2cccc(Br)c21]
6,6'-dibromo indigo
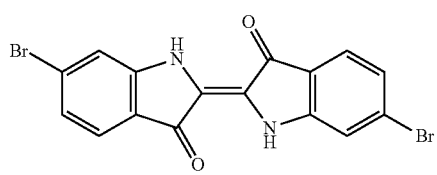 [SMILES: O=C1/C(=C2\Nc3cc(Br)ccc3C2=O)Nc2cc(Br)ccc21]
5,5'-dibromo indigo
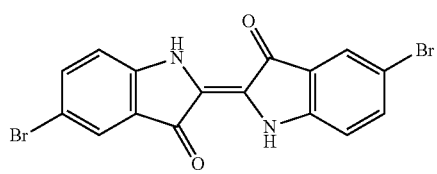 [SMILES: O=C1/C(=C2\Nc3ccc(Br)cc3C2=O)Nc2ccc(Br)cc21]
cis-6,6'-dibromo indirubin
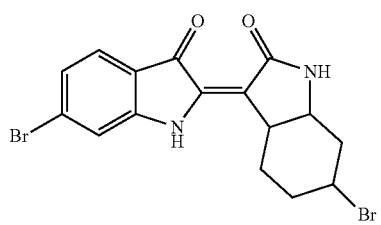 [SMILES: O=C1NC2CC(Br)CCC2/C1=C1\Nc2cc(Br)ccc2C1=O]

TABLE 1-continued
| | | |
|---|---|---|
| 5,5',7,7'-tétrabromo indigo | 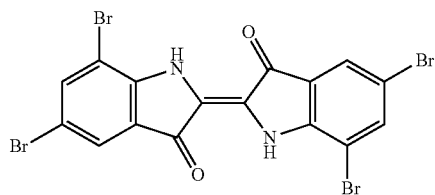 [SMILES: O=C1/C(=C2\Nc3c(Br)cc(Br)cc3C2=O)Nc2c(Br)cc(Br)cc21] | |
| 4,4',7,7'-tétrachloroindigo | 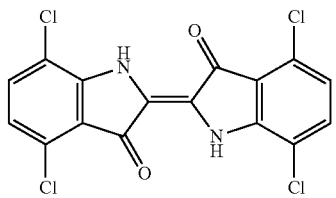 [SMILES: O=C1/C(=C2\Nc3c(Cl)ccc(Cl)c3C2=O)Nc2c(Cl)ccc(Cl)c21] | |
| 3H-Indol-3-one, 1,2-dihydro-2-(3-oxobenzo[b]thien-2(3H)-ylidene) | 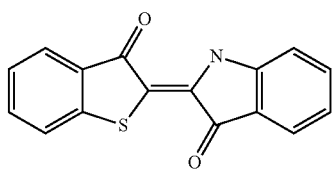 [SMILES: O=C1/C(=C2\Sc3ccccc3C2=O)Nc2ccccc21] | |
| Thioindigo (also called: C.I. 73300 C.I. Disperse Red 364 C.I. Solvent Red 242 C.I. Vat Red 41 Ciba Pink B Disperse Red 364) | 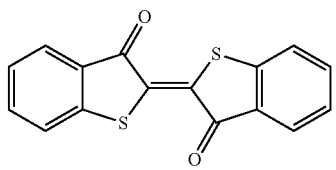 [SMILES: O=C1/C(=C2\Sc3ccccc3C2=O)Sc2ccccc21] | |
| Vat Red 1 (Oralith) | 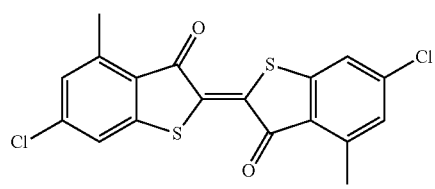 [SMILES: Cc1cc(Cl)cc2c1C(=O)/C(=C1\Sc3cc(Cl)cc(C)c3C1=O)S2] | |
| Cis-Thioindigo (Benzo[b]thiophen-3(2H)-one, 2-(3-oxobenzo[b]thien-2(3H)-ylidene)-, (2Z)) | 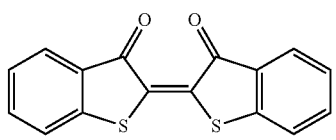 [SMILES: O=C1/C(=C2/Sc3ccccc3C2=O)Sc2ccccc21] | |
| 6,6'-dichloro-4,4'-diméthylindigo | 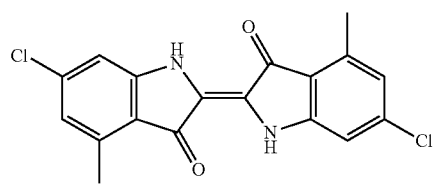 [SMILES: Cc1cc(Cl)cc2c1C(=O)/C(=C1\Nc3cc(Cl)cc(C)c3C1=O)N2] | |
| 5,5'-dichloro-7,7'-diméthylindigo | 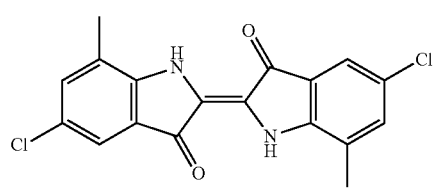 [SMILES: Cc1cc(Cl)cc2c1N/C(=C1/Nc3c(C)cc(Cl)cc3C1=O)C2=O] | |

TABLE 1-continued

| | |
|---|---|
| 4,4',7,7'-tétraméthylindigo | 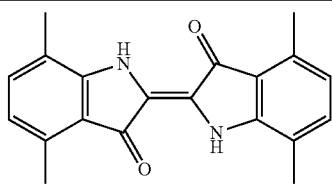 |
| Thioindigo Scarlet R (also known as: 2H-Indol-2-one, 1,3-dihydro-3-(3-oxobenzo[b]thien-(3H)-ylidene; C.I. 73635) | 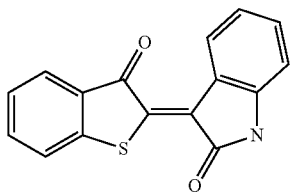 [SMILES: O=C1Nc2ccccc2/C1=C1/Sc2ccccc2C1=O] |
| 2H-Indol-2-one, 1,3-dihydro-3-(3-oxobenzo[b]thien-2(3H)-ylidène)-, (3E)- | 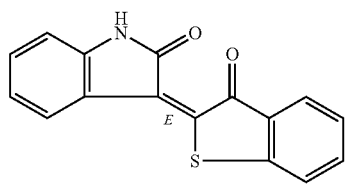 [SMILES: O=C1Nc2ccccc2/C1=C1\Sc2ccccc2C1=O] |
| Thioindirubine (Benzo[b]thiophen-3(2H)-one, 2-(2-oxobenzo[b]thiophen-3(2H)-ylidene)) | 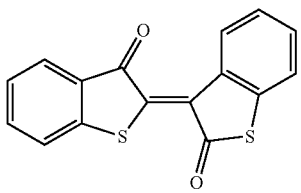 [SMILES: O=C1Sc2ccccc2/C1=C1/Sc2ccccc2C1=O] |
| 2H-Indol-2-one, 1,3-dihydro-3-(2-oxobenzo[b]thiophen-3(2H)-ylidene)- | 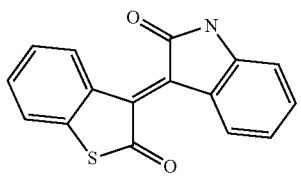 [SMILES: O=C1Nc2ccccc2/C1=C1\C(=O)Sc2ccccc21] |
| Benzo[b]thiophen-2(3H)-one, 3-(2-oxobenzo[b]thiophen-3(2H)-ylidene) | 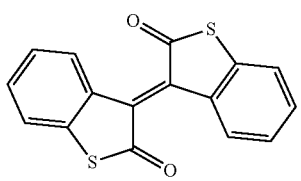 [SMILES: O=C1Sc2ccccc2/C1=C1\C(=O)Sc2ccccc21] |

In embodiments, the modified naturally-derived colorants herein include a modifying component that is an aliphatic quaternary ammonium salt or aromatic quaternary ammonium salt and mixtures thereof and any suitable halide such as chlorine, bromine or iodine. Suitable N-alkyl/aryl counterions to be used in the modification may be selected from the group consisting of quaternary ammonium $NH_4$, or any alkyl or aryl quaternary ammonium, such as tetrabutylammonium, tetraoctylammonium, tetradodecylammonium, tetraoctadecylammonium, N,N-dimethyl dioctadecylammonium, N,N-dimethyl dioctyl ammonium, N,N-dimethyl dodecyl ammonium, N,N,N-trimethyl-1-docosanaminium, behenyl trimethylammonium, N-octadecyltrimethylammonium, and other quaternary ammonium compounds such as the quaternary ammonium compounds known as ARQUAD®s available from Akzo Nobel N.V., and mixtures thereof.

The quaternary ammonium compounds known as the ARQUAD®s are primarily alkyltrimethylammonium chlorides and may be represented by the formula $R-N(CH_3)_3Cl$ wherein R is a long chain alkyl group having at least 8 carbon atoms. These particular quaternary ammonium compounds are marketed by Akzo Nobel N.V. under the tradename ARQUAD®. Examples of suitable ARQUAD® materials are: Arquad® 316, cocoalkyltrimethylammonium from ARQUAD® C-35, didecydimethylammonium from ARQUAD® 2.10-50, ARQUAD® 2.10-70 HFP, 2.10-80, coco(fractionated) dimethylbenzylammonium from ARQUAD® MCB 33, ARQUAD® MCB 50, ARQUAD® MCB 80, hexadecyltrimethylammonium from ARQUAD® 16-29, stearyltrimethylammonium from ARQUAD® 18-50, behenyltrimethylammonium from ARQUAD® 20-80, or salts thereof. A variety of compounds of this class are available varying as to the length and number of long chain alkyl groups attached to the nitrogen atom. In other embodiments, the N-alkyl or N-aryl counterion is selected from one of the following:

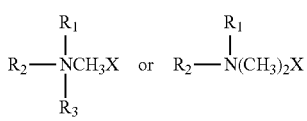

wherein $R_1$, $R_2$ and $R_3$ can be identical or different from one another and wherein each of $R_1$, $R_2$ and $R_3$ is independently selected from the group consisting of alkyl, alkoxy, aryl, and alkylaryl and wherein X is any halogen atom. In embodiments, the alkyl, alkoxy, aryl, and alkylaryl groups have equal to or greater than 4 carbon atoms. The quaternary ammonium counter ion can also include alkoxylates such as the following:

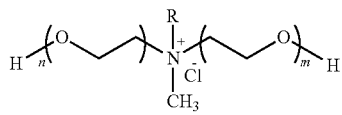

wherein R is H, $CH_3$, any alkyl linear or branched, alkoxyl; and wherein m is an integer from 1 to 25 and wherein n is an integer from 1 to 25 and wherein, in embodiments m+n is from about 2 to about 25.

Examples include Ethoquad® C/12 wherein R is coco (a complex mixture of unsaturated and saturated C6 to C18 acids from coconut oil) and wherein m+n=2, Ethoquad® C/25 wherein R is coco and wherein m+n=15, Ethoquad® O/12 wherein R is oleyl and m+n=2, all available from Lion Akzo Corporation.

In embodiments, the quaternary ammonium counter ion herein can be an oligomer of the general formula

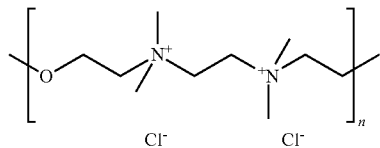

wherein n is at least 1. In a specific embodiment, the quaternary ammonium counter ion is poly[oxy-1,2-ethanediyl(dimethyliminio)-1,2-ethanediyl(dimethyliminio)-1,2-ethanediylchloride (1:2)] (Polixetonium chloride) available from Advantis Technologies, Inc.

Examples of counter ions containing aryl groups include, but are not limited to, benzyltributylammonium bromide, benzyltributylammonium chloride, benzyltriethylammonium chloride, benzyltriethylammonium bromide, benzyltriethylammonium iodide, benzyltrimethylammonium iodide, benzyltrimethylammonium bromide, benzyltrimethylammonium chloride (neat or in solution)].

In certain embodiments, the naturally-derived colorant is modified with an aliphatic quaternary ammonium salt comprising an alkyl chain having at least eight carbon atoms, and, in embodiments, having more than 8 carbon atoms.

In other embodiments, the aliphatic quaternary ammonium salt, aromatic quaternary ammonium salt, or a mixture or combination thereof, is bio-based. Bio-based as used herein means that the aliphatic quaternary ammonium salt, an aromatic quaternary ammonium salt, or a mixture or combination thereof, is derived from natural sources. Bio-based materials are materials that are derived in whole or part from renewable biomass resources. Biomass resources are organic materials that are available on a renewable or recurring basis such as from crop residues, wood residues, grasses, and aquatic plants and as derived from bacteria and other microorganisms. Corn ethanol is a well-known example of a bio-based material derived from biomass resources. A bioproduct is a product that contains some amount of biobased material within it.

In other embodiments, the modified naturally-derived colorant is modified with an aliphatic quaternary ammonium salt, aromatic quaternary ammonium salt, or mixture or combination thereof, that contains an alkyl chain having at least 8 carbon atoms, and in embodiments having more than 8 carbon atoms, wherein the alkyl chain is biobased. Biobased as used here means that the alkyl chain portion of the aliphatic quaternary ammonium salt, aromatic quaternary ammonium salt, or mixture or combination thereof is derived from natural sources.

Examples of bio-based quaternary ammonium salts include, but are not limited to, polyquaternium-4 (hydroxyethyl cellulose dimethyl diallylammonium chloride copolymer), polyquaternium-10 (quaternized hydroxyethyl cellulose), ARQUAD® PC 268-75 PG (ceteardimonium chloride and propylene Glycol), ARQUAD® PC C-33W (cocotrimonium chloride), ARQUAD® PC C-35 (cocotrimonium chloride), ARQUAD® PC 2C-75 (dicocodimonium chloride (and) isopropyl alcohol), ARQUAD® PC 16-29 (cetrimonium chloride), ARQUAD® PC 16-50 (cetrimonium chloride and isopropyl alcohol), ARQUAD® C-33W (cocoalkyl ammonium chloride), ARQUAD® C-50 (cocoalkyl ammonium chloride), ARQUAD® S-50 (soyaalkylammonium chloride), ARQUAD® T-27W (tallowalkylammonium chloride), ARQUAD® T-50 (tallowalkylammonium chloride), ARQUAD® 2C-70 nitrite dicocoalkyl-(b)-ammonium chloride), ARQUAD® 2C-70 PG (dicocoalkylammonium chloride), ARQUAD® 2C-75 (dicocoalkylammonium chloride), ARQUAD® 2HT-75 di(hydrogenated tallowalkyl)ammonium chloride), ARQUAD® 2HT-75 PG di(hydrogenated tallowalkyl)-(a)-ammonium chloride), ARQUAD® HTL8 MS 2-ethylhexyl hydrogenated tallowalkyl-(c)-ammonium chloride), ARQUAD® DMCB-80 (benzyldimethyl-cocoalkylammonium chloride), ARQUAD® DMHTB-75 (benzyldimethyl-(hydrogenated tallowalkyl)ammonium chloride), ARQUAD® M2HTB (benzylmethyl-di(hydrogenated tallowalkyl)ammonium chloride), ETHOQUAD® C/12B (benzylcocoalkyl[ethoxylated (2)]-ammonium chloride), ETHOQUAD® C/12-75 (cocoalkylmethyl[ethoxylated (2)]-ammonium chloride), ETHOQUAD® C/12 Nitrate (cocoalkylmethyl[ethoxylated (2)]-ammonium nitrate, ETHOQUAD® C/25 (cocoalkylmethyl[ethoxylated (15)]-ammonium chloride, ETHOQUAD® O/12 PG (oleylmethyl[ethoxylated (2)]-ammonium chloride, ETHOQUAD® T/13-27W (tris(2-hydroxyethyl)tallowalkylammonium acetates, ETHOQUAD® T/25 (tallowalkylmethyl[ethoxylated (15)]-ammonium chloride, DUOQUAD® T-50 (N,N,N',N',N'-pentamethyl-N-tallow-1,3-propanediammonium dichloride and the like and mixtures thereof.

In specific embodiments, the modifying component is a quaternary ammonium salt such as N,N-dimethyldioctadecyl ammoniumbromide.

In specific embodiments, the quaternary ammonium counter ion herein can be esterquats of the formulae

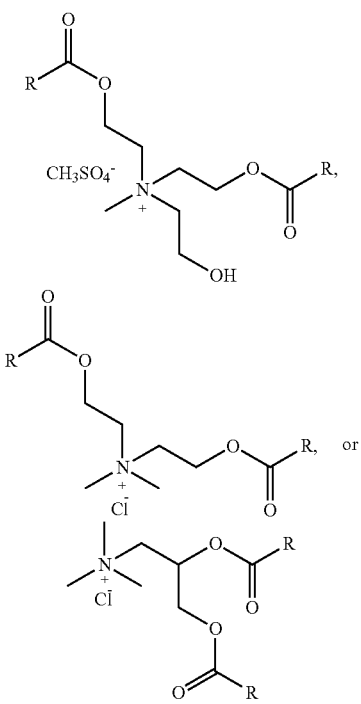

wherein R is n-heptyl, n-nonyl, n-undecyl, n-tridecyl, n-pentadecyl, n-heptadecyl, n-nonadecyl, n-heneicosyl and mixtures thereof.

Examples of esterquats include, but are not limited to, esterquats such as those available from Kao Chemicals Inc., quaternary ammonium salts of: reacted fatty acids, C10-C20 and unsaturated C16-C18, with triethanolamine (CAS No. 91995-81-2), reacted tallow fatty acids with triethanolamine (CAS No. 93334-15-7), reacted fatty acids, C12-C20 with triethanolamine (CAS No. 91032-11-0), reacted 9-octadecenoic acid (Z) with triethanolamine (CAS No. 94095-35-9), reacted octadecenoic acid with triethanolamine (CAS No. 85408-12-4). Other examples of esterquats include dimethylbis[2-[(1-oxooctadecyl)oxy]ethyl]ammonium chloride (CAS No. 67846-68-8), Dimethylbis[2-[(1-oxohexadecyl)oxy]ethyl]ammonium chloride (97158-31-1) and (Z)-2-hydroxy-3-[(1-oxo-9-octadecenyl)oxy]propyltrimethylammonium chloride (CAS No. 19467-38-0).

In other embodiments, quaternary ammonium compounds comprising alkyltrimethylammonium chlorides represented by the formula R—N(CH$_3$)$_3$Cl wherein R is a long chain alkyl group having at least 8 carbon atoms can be selected as the modifying component. A variety of compounds of this class are available varying as to the length and number of long chain alkyl groups attached to the nitrogen atom. Certain quaternary ammonium compounds are marketed by Akzo Nobel N.V. under the trade-name ARQUAD® such as Arquad® 316. In embodiments, the long chain aliphatic quaternary ammonium counterion comprises at least one unsaturation.

In embodiments, colorant-laden latexes prepared in accordance with methods disclosed herein are used to form toner particles whcih may optionally have a shell-core configuration. In embodiments, the color laden latex may be used in the shell only, the core only, or in both the core and the shell. In forming toner particles, the color-laden polymer resin particles of the latex may be formulated with conventional additives such as waxes, coagulants, and even further colorants, and subjected to aggregation with the aid of polyaluminum chloride. Such aggregation may be carried out with mixing and heating in a controlled manner to create aggregated particles with a well-defined narrow distribution of effective diameters. In embodiments, the effective diameter may be in a range from about 2 to about 6 microns, or about 4 to about 6 microns, or about 5 microns. The aggregation may be performed with the color-laden latex as described herein, or with a latex lacking colorant. Where the core toner particle latex lacks colorant, processes disclosed herein include providing a shell latex having the colorant dispersed therein and coalescing the colorant-laden shell latex about the surface of the aggregated particles via heating.

The resultant core-shell toner particle may have an effective diameter in a range of from about 3 microns to about 7 microns, or about 4 to about 6 microns, or about 5 microns. One skilled in the art will appreciate that the controlled emulsion aggregation/coalescence process allows the user to access toner particles larger or smaller than these recited ranges if so desired.

In particular embodiments, there are provided latexes comprising copolymer nanoparticles having a colorant comprising an anionic functional group and a lipophilic counter ion dispersed within a matrix of the copolymer nanoparticles. Such latexes are prepared in accordance with the methods disclosed herein. In particular embodiments, the copolymer nanoparticles comprise styrene-acrylate copolymer and the colorant comprises a modified pigment selected from an indigo, and combinations thereof. In embodiments, the colorant may be covalently bound to the matrix. Such covalent bonding motifs may be accessible when employing, for example, modified colorants comprising lipophilic groups having on or more unsaturations, i.e., alkenes (olefins).

Resin

In embodiments, the monomer comprises a styrene, an acrylate, a methacrylate, a butadiene, an isoprene, an acrylic acid, a methacrylic acid, an acrylonitrile, and combinations thereof. Processes disclosed herein may employ one or more monomers comprising a styrene, an acrylate, a methacrylate, a butadiene, an isoprene, an acrylic acid, a methacrylic acid, an acrylonitrile, and combinations thereof. Any monomer suitable for preparing a latex for use in a toner may be utilized. As noted above, in embodiments the toner may be produced by emulsion aggregation. Suitable monomers useful in forming a latex polymer emulsion, and thus the resulting latex particles in the latex emulsion, include, but are not limited to, styrenes, acrylates, methacrylates, butadienes, isoprenes, acrylic acids, methacrylic acids, acrylonitriles, combinations thereof, and the like.

In embodiments, the latex polymer may include at least one polymer. In embodiments, at least one may be from about one to about twenty and, in embodiments, from about three to about ten. Exemplary polymers include styrene acrylates, styrene butadienes, styrene methacrylates, and more specifically, poly(styrene-alkyl acrylate), poly(styrene-1,3-diene), poly(styrene-alkyl methacrylate), poly (styrene-alkyl acrylate-acrylic acid), poly(styrene-1,3-diene-acrylic acid), poly (styrene-alkyl methacrylate-acrylic acid), poly (alkyl methacrylate-alkyl acrylate), poly(alkyl methacrylate-aryl acrylate), poly(aryl methacrylate-alkyl acrylate), poly (alkyl methacrylate-acrylic acid), poly(styrene-alkyl acrylate-acrylonitrile-acrylic acid), poly (styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly (ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly (methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly (styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and combinations thereof. The polymers may be block, random, or alternating copolymers.

Colorant

In embodiments, colorants disclosed herein may possess an anionic functional group comprising one selected from the group consisting of a sulfonate, a carboxylate, a phosphate, and combinations thereof. In embodiments, the anionic functional group may be paired with a lipophilic counter ion that is a quaternary ammonium ion. In embodiments, a loading of the colorant is in a range from about 0.1 to about 25 percent by weight, or about 1 to about 15 percent by weight of the latex particle composition.

In embodiments, the colorant comprises an indigo. Natural colorants such as indigo, referenced as C.I. Pigment Blue 66, C.I. Vat Blue 1 and C.I. Reduced Vat Blue 1 (all listed as C.I. 73000) and its derivatives, are also known as "ancient blues."

Woad (Indigo) has a structure according to Formula I:

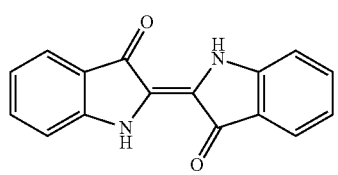

I

Another woad (indigo) derivative is indirubin, known as (also known as Indigo Red (CAS No. 75790)) and has the structure of Formula II:

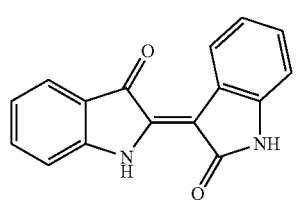

II

Another indigo includes Tyrian Purple which includes compounds of Formula III and IV below:

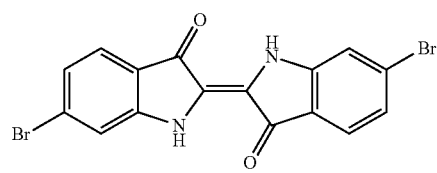

III

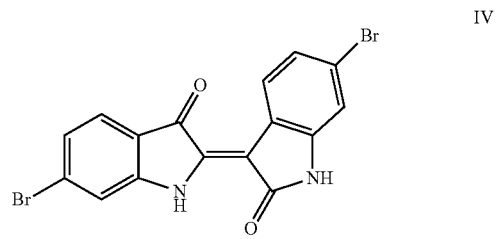

IV

The naturally-derived pigment indigo has been derivatized by sulfonation and salting the product in brine, as indicated by compounds of Formula V and VI below. In accordance with embodiments disclosed herein, sodium ion may be exchanged with a long chain alkyl quaternary ammonium salt which has the added benefit of reducint the particle size of the pigment.

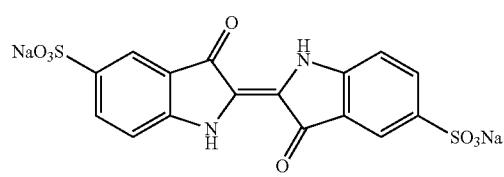

V

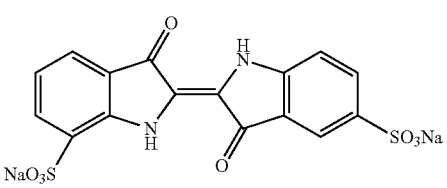

VI

Structures V and VI above are known as disodium 2-(1,3-dihydro-3-oxo-7-sulphonato-2H-indol-2-ylidene)-3-oxoindoline-5-sulfonate (CAS No. 27414-68-2).

Sulfonated indigo can also comprise multiple sulfonate ($SO_3^-$) groups such as the compounds of Formula VII and VIII below:

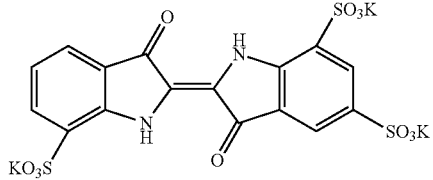

VII

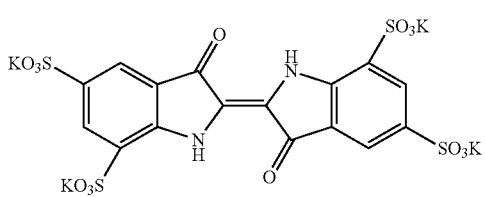

VIII

Indirubin can also be sulfonated to yield a compound of Formula IX:

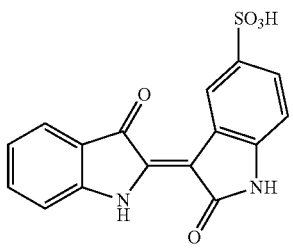

IX

This molecule is also known as Indirubin-5-sulfonic acid (CAS No. 864131-82-8).

For the further modification of the indigo derivatives, quaternary ammonium salts such as N,N-dimethyldioctadecyl ammoniumbromide and Arquad 316 may used; but any mixture of aliphatic, olefinic or aromatic quaternary ammonium salts can be used. The modification of the sulfonated colorants may be carried out in water by heating them with the desired quaternary ammonium salts. The final product may be isolated by filtration and washed with copious amounts of water to remove the inorganic salts formed. The structure of exemplary modified colorants X-XIII are shown below.

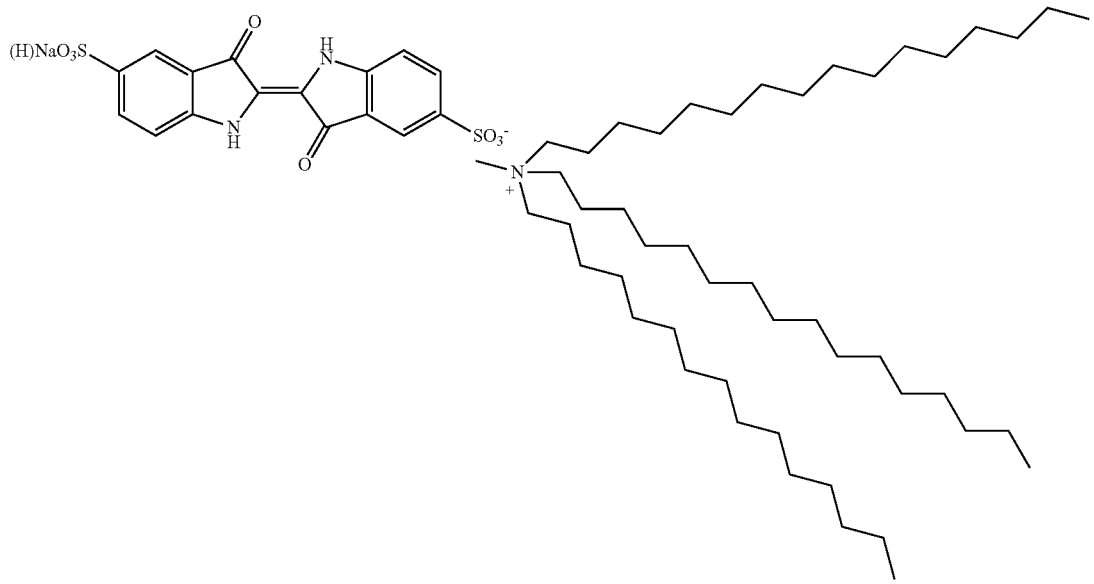

X

-continued
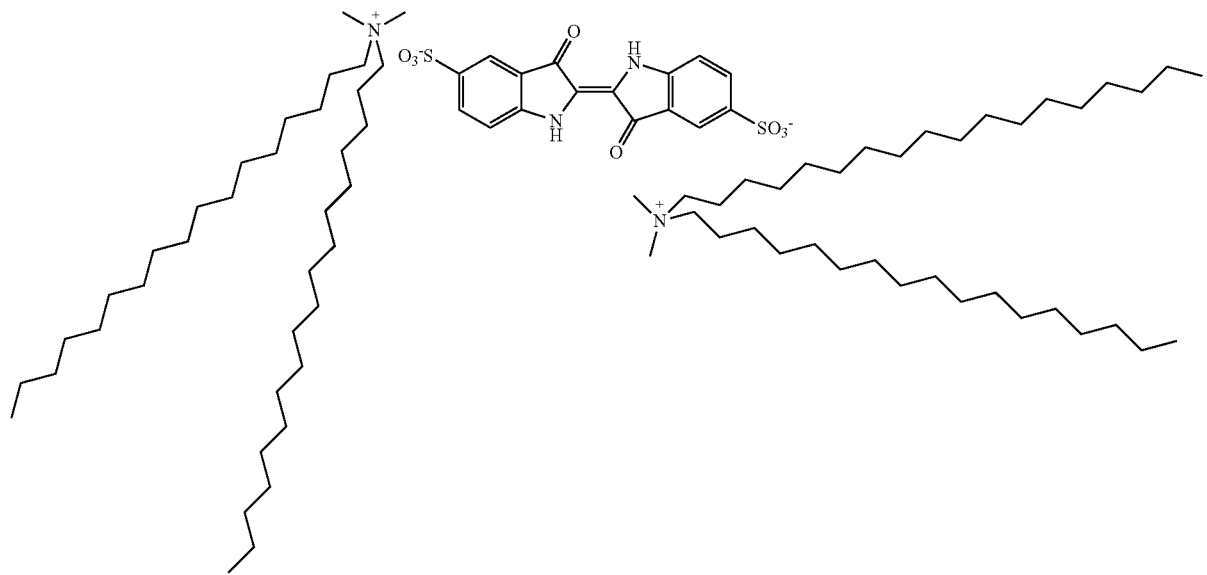
XI
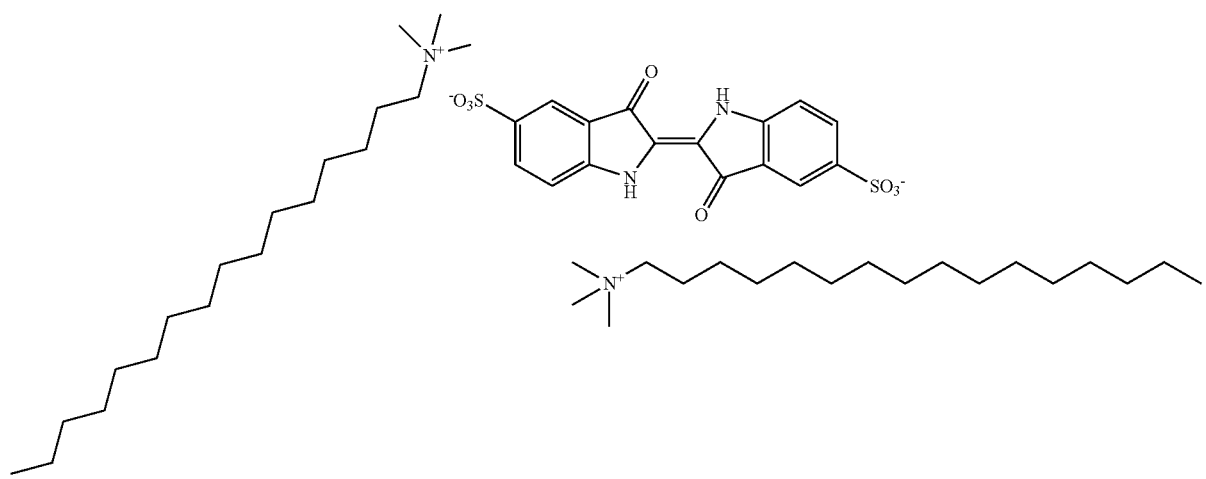
XII

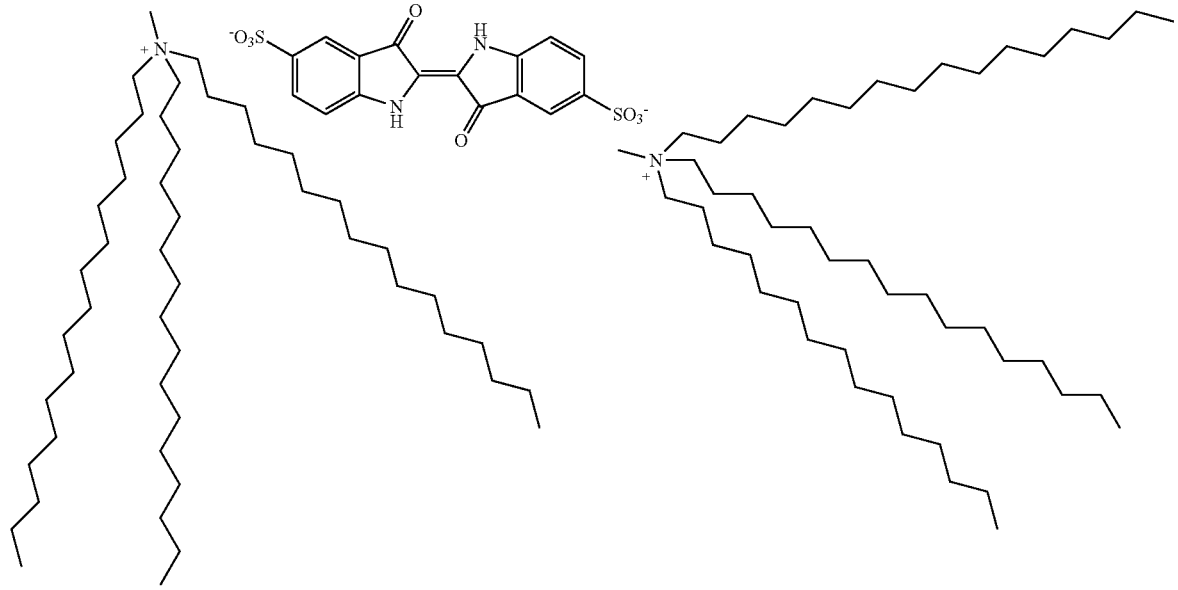

The modified colorant-laden latex can be prepared by incorporating the modified pigment in the (organic) monomer phase prior to preparing an oil/water (o/w) emulsion for carrying out the emulsion polymerization reaction. A seed, which contains the modified colorant and monomers, is added to the o/w emulsion followed by a conventional emulsion polymerization process using a semicontinuous feed to maintain monomer-starved conditions. Regular stirring is used for both the reactor and monomer feed solution which is unlike typical methods which employ ultrasonication (i.e., ultrasonically initiated emulsion polymerization) which is known to increase the probability of monomer coating into individual particles prior to polymerization.

The colorant-laden latex particles may be optionally added to a further colorant dispersion. Such further colorant dispersions may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. In embodiments, the surfactant may be ionic and may be from about 1 to about 25 percent by weight, and in embodiments from about 4 to about 15 percent by weight, of the colorant.

Colorants useful in forming both latexes and supplemented in forming toners in accordance with embodiments herein include pigments, dyes, mixtures of pigments and dyes, mixtures of pigments, mixtures of dyes, and the like. The colorant may be, for example, carbon black, cyan, yellow, magenta, red, orange, brown, green, blue, violet, or combinations thereof. In embodiments a pigment may be utilized. As used herein, a pigment includes a material that changes the color of light it reflects as the result of selective color absorption. In embodiments, in contrast with a dye which may be generally applied in an aqueous solution, a pigment generally is insoluble. For example, while a dye may be soluble in the carrying vehicle (the binder), a pigment may be insoluble in the carrying vehicle.

In embodiments wherein the colorant is a pigment, the pigment may be, for example, carbon black, phthalocyanines, quinacridones, red, green, orange, brown, violet, yellow, fluorescent colorants including RHODAMINE B™ type, and the like.

The colorant may be present in the toner of the disclosure in an amount of from about 1 to about 25 percent by weight of toner, in embodiments in an amount of from about 2 to about 15 percent by weight of the toner.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant. Pigment Red 122 (sometimes referred to herein as PR-122) has been widely used in the pigmentation of toners, plastics, ink, and coatings, due to its unique magenta shade. The chemical structures of PR-122, Pigment Red 269, and Pigment Red 185 (sometimes referred to herein as PR-185) are set forth below.

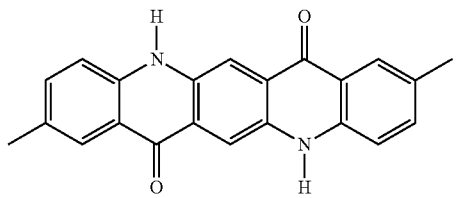

Pigment PR 122 (2,9-dimethylquinacridone)

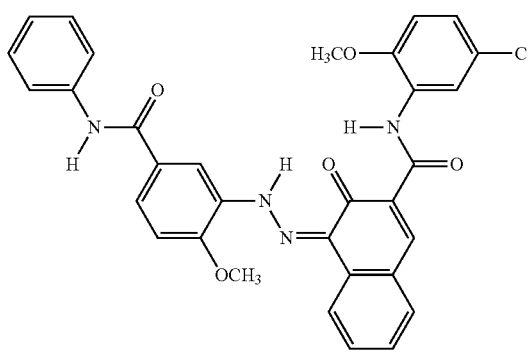

Pigment Red 269

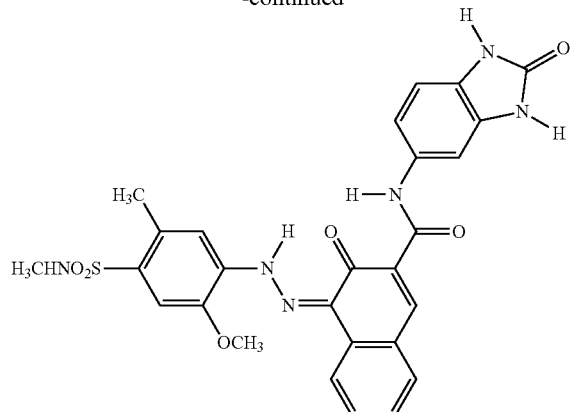

Pigment Red 185

In embodiments, latex formation by emulsion polymerization may be carried out in the presence of other additives selected from the group consisting of a crosslinker, a charge control agent, a chain transfer agent, a surfactant, and combinations thereof. In embodiments, emulsion polymerization may be carried out with a seed particle latex. In some such embodiments, the seed comprises a colorant in accordance with embodiments disclosed herein. In other embodiments, the seed does not include a colorant is functions solely for seeding purposes. Preparing a seed particle latex by aqueous emulsion polymerization of a mixture comprised of part of the monomer emulsion, from about 0.5 to about 50 percent by weight, and preferably from about 3 to about 25 percent by weight of monomer emulsion prepared from pre-reaction monomer emulsification which comprises emulsification of the polymerization reagents of monomers, chain transfer agent, water, surfactant, and optional, but preferably an initiator.

Surfactants

In embodiments, the latex may be prepared in an aqueous phase containing a surfactant or co-surfactant. Surfactants which may be utilized with the polymer to form a latex dispersion can be ionic or nonionic surfactants, or combinations thereof, in an amount of from about 0.01 to about 15 weight percent of the solids, in embodiments of from about 0.1 to about 10 weight percent of the solids, in embodiments from about 1 to about 7.5 weight percent solids.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., combinations thereof, and the like.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof, and the like. In embodiments a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be utilized.

The choice of particular surfactants or combinations thereof, as well as the amounts of each to be used, are within the purview of those skilled in the art.

Initiators

In embodiments initiators may be added for formation of the latex polymer. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate, and combinations thereof. Other water-soluble initiators which may be utilized include azoamidine compounds, for example 2,2'-azobis(2-methyl-N-phenylpropionamidine) dihydrochloride, 2,2'-azobis[N-(4-chlorophenyl)-2-methylpropionamidine] di-hydrochloride, 2,2'-azobis[N-(4-hydroxyphenyl)-2-methylpropionamidine]dihydrochloride, 2,2'-azobis[N-(4-aminophenyl)-2-methylpropionamidine]tetrahydrochloride, 2,2'-azobis[2-methyl-N(phenylmethyl)propionamidine] dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, combinations thereof, and the like.

Initiators can be added in suitable amounts, such as from about 0.1 to about 8 weight percent of the monomers, in embodiments of from about 0.2 to about 5 weight percent of the monomers, in embodiments from about 0.5 to about 4 weight percent of the monomers.

Chain Transfer Agents

In embodiments, chain transfer agents may also be utilized in forming the latex polymer. Suitable chain transfer agents include dodecane thiol, octane thiol, carbon tetrabromide, combinations thereof, and the like, in amounts from about 0.1 to about 10 percent of monomers, in embodiments from about 0.2 to about 5 percent by weight of monomers, and in embodiments from about 0.5 to about 3.5 percent by weight of monomers, to control the molecular weight properties of the latex polymer when emulsion polymerization is conducted in accordance with the present disclosure.

Wax

When forming toner particles, the latex may be added to a wax. Wax dispersions may also be added during formation of a latex polymer in an emulsion aggregation synthesis. Suitable waxes include, for example, submicron wax particles in the size range of from about 50 to about 1000 nanometers, in embodiments of from about 100 to about 500 nanometers in volume average diameter, suspended in an aqueous phase of water and an ionic surfactant, nonionic surfactant, or combinations thereof. Suitable surfactants include those described above. The ionic surfactant or nonionic surfactant may be present in an amount of from about 0.1 to about 20 percent by weight, and in embodiments of from about 0.5 to about 15 percent by weight of the wax.

The wax dispersion according to embodiments of the present disclosure may include, for example, a natural vegetable wax, natural animal wax, mineral wax, and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and combinations thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasel K.K., and similar materials. In embodiments, commercially available polyethylene waxes possess a molecular weight (Mw) of from about 100 to about 5000, and in embodiments of from about 250 to about 2500, while the commercially available polypropylene waxes have a molecular weight of from about 200 to about 10,000, and in embodiments of from about 400 to about 5000.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, JONCRYL 74, 89, 130, 537, and 538, all available from Johnson Diversey, Inc, or chlorinated polypropylenes and polyethylenes commercially available from Allied Chemical, Baker Petrolite Corporation and Johnson Diversey, Inc.

The wax may be present in an amount of from about 0.1 to about 30 percent by weight, and in embodiments from about 2 to about 20 percent by weight of the toner.

Charge Control Agents

A charge control agent (CCA) may be added to the toner particles. In embodiments, the CCA may be added to a latex, optional further colorant dispersion, wax, and aggregating agent to incorporate the CCA within the toner particles. In other embodiments, the CCA may be added once the particles have formed as part of a shell. The use of a CCA may be useful for triboelectric charging properties of a toner, because it may impact the imaging speed and quality of the resulting toner.

Suitable charge control agents which may be utilized include, in embodiments, metal complexes of alkyl derivatives of acids such as salicylic acid, other acids such as dicarboxylic acid derivatives, benzoic acid, oxynaphthoic acid, sulfonic acids, other complexes such as polyhydroxyalkanoate quaternary phosphonium trihalozincate, metal complexes of dimethyl sulfoxide, combinations thereof, and the like. Metals utilized in forming such complexes include, but are not limited to, zinc, manganese, iron, calcium, zirconium, aluminum, chromium, combinations thereof, and the like. Alkyl groups which may be utilized in forming derivatives of salicylic acid include, but are not limited to, methyl, butyl, t-butyl, propyl, hexyl, combinations thereof and the like. Examples of such charge control agents include those commercially available as BONTRON® E-84 and BONTRON® E-88 (commercially available from Orient Chemical). BONTRON® E-84 is a zinc complex of 3,5-di-tert-butylsalicylic acid in powder form. BONTRON® E-88 is a mixture of hydroxyaluminium-bis[2-hydroxy-3,5-di-tert-butylbenzoate] and 3,5-di-tert-butylsalicylic acid. Other suitable CCAs include the calcium complex of 3,5-di-tert-butylsalicylic acid, a zirconium complex of 3,5-di-tert-butylsalicylic acid, and an aluminum complex of 3,5-di-tert-butylsalicylic acid, as disclosed in U.S. Pat. Nos. 5,223,368 and 5,324,613, the disclosures of each of which are incorporated by reference in their entirety, combinations thereof, and the like.

Where utilized, the charge control agent may be present in an amount of from about 0.01 percent by weight to about 10 percent by weight of the toner particle, in embodiments from about 0.05 percent by weight to about 5 percent by weight of the toner particle, in embodiments from about 0.1 percent by weight to about 3 percent by weight of the toner particle.

Reaction Conditions to Form Toner Particles

In embodiments, methods disclosed herein further comprise forming toner particles from the resultant latexes. In the emulsion aggregation process, the reactants may be added to a suitable reactor, such as a mixing vessel. A blend of latex, optional colorant dispersion, wax, and aggregating agent, may then be stirred and heated to a temperature near the Tg of the latex, in embodiments from about 30° C. to about 70° C., in embodiments from about 40° C. to about 65° C., resulting in toner aggregates of from about 3 microns to about 15 microns in volume average diameter, in embodiments of from about 5 microns to about 9 microns in volume average diameter.

In embodiments, a shell may be formed on the aggregated particles. Any latex utilized noted above to form the core latex may be utilized to form the shell latex. In embodiments, a styrene-n-butyl acrylate copolymer may be utilized to form the shell latex. In embodiments, the latex utilized to form the shell may have a glass transition temperature of from about 35° C. to about 75° C., in embodiments from about 40° C. to about 70° C. In embodiments, a shell may be formed on the aggregated particles including a blend of a first latex for the core and a latex incorporated with a CCA.

Where present, a shell latex may be applied by any method within the purview of those skilled in the art, including dipping, spraying, and the like. The shell latex may be applied until the desired final size of the toner particles is achieved, in embodiments from about 3 microns to about 12 microns, in other embodiments from about 4 microns to about 8 microns. In other embodiments, the toner particles may be prepared by in-situ seeded semi-continuous emulsion copolymerization of the latex with the addition of the shell latex once aggregated particles have formed.

Coagulants

In embodiments, a coagulant may be added during or prior to aggregating the latex and the aqueous colorant dispersion. The coagulant may be added over a period of time from about 1 minute to about 60 minutes, in embodiments from about 1.25 minutes to about 20 minutes, depending on the processing conditions.

Examples of suitable coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, combinations thereof, and the like. One suitable coagulant is PAC, which is commercially available and can be prepared by the controlled hydrolysis of aluminum chloride with sodium hydroxide. Generally, PAC can be prepared by the addition of two moles of a base to one mole of aluminum chloride. The species is soluble and stable when dissolved and stored under acidic conditions if the pH is less than about 5. The species in solution is believed to contain the formula $Al_{13}O_4(OH)_{24}(H_2O)_{12}$ with about 7 positive electrical charges per unit.

In embodiments, suitable coagulants include a polymetal salt such as, for example, polyaluminum chloride (PAC), polyaluminum bromide, or polyaluminum sulfosilicate. The polymetal salt can be in a solution of nitric acid, or other diluted acid solutions such as sulfuric acid, hydrochloric acid, citric acid or acetic acid. The coagulant may be added in amounts from about 0.01 to about 5 percent by weight of the toner, and in embodiments from about 0.1 to about 3 percent by weight of the toner.

Aggregating Agents

Any aggregating agent capable of causing complexation might be used in forming toner of the present disclosure. Both alkali earth metal or transition metal salts can be utilized as aggregating agents. In embodiments, alkali (II) salts can be selected to aggregate sodium sulfonated polyester colloids with a colorant to enable the formation of a toner composite. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally combinations thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, combinations thereof, and the like. The resulting blend of latex, optionally in a dispersion, CCA, optionally in dispersion, optional colorant dispersion, optional wax, optional coagulant, and optional aggregating agent, may then be stirred and heated to a temperature below the Tg of the latex, in embodiments from about 30° C. to about 70° C., in embodiments of from about 40° C. to about 65° C., for a period of time from about 0.2 hours to about 6 hours, in embodiments from about 0.3 hours to about 5 hours, resulting in toner aggregates of from about 3 microns to about 15 microns in volume average diameter, in embodiments of from about 4 microns to about 8 microns in volume average diameter.

Once the desired final size of the toner particles is achieved, the pH of the mixture may be adjusted with a base to a value of from about 3.5 to about 7, and in embodiments from about 4 to about 6.5. The base may include any suitable base such as, for example, alkali metal hydroxides such as, for example, sodium hydroxide, potassium hydroxide, and ammonium hydroxide. The alkali metal hydroxide may be added in amounts from about 0.1 to about 30 percent by weight of the mixture, in embodiments from about 0.5 to about 15 percent by weight of the mixture.

The mixture of latex, latex incorporated with a CCA, optional colorant, and optional wax may be subsequently coalesced. Coalescing may include stirring and heating at a temperature of from about 80° C. to about 99° C., in embodiments from about 85° C. to about 98° C., for a period of from about 0.5 hours to about 12 hours, and in embodiments from about 1 hour to about 6 hours. Coalescing may be accelerated by additional stirring.

The pH of the mixture may then be lowered to from about 3.5 to about 6, in embodiments from about 3.7 to about 5.5, with, for example, an acid to coalesce the toner aggregates. Suitable acids include, for example, nitric acid, sulfuric acid, hydrochloric acid, citric acid or acetic acid. The amount of acid added may be from about 0.1 to about 30 percent by weight of the mixture, and in embodiments from about 1 to about 20 percent by weight of the mixture.

The mixture is cooled in a cooling or freezing step. Cooling may be at a temperature of from about 20° C. to about 40° C., in embodiments from about 22° C. to about 30° C. over a period time from about 1 hour to about 8 hours, and in embodiments from about 1.5 hours to about 5 hours.

In embodiments, cooling a coalesced toner slurry includes quenching by adding a cooling medium such as, for example, ice, dry ice and the like, to effect rapid cooling to a temperature of from about 20° C. to about 40° C., and in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture may be implemented by the introduction of a heat exchanger when the final toner slurry is discharged.

The toner slurry may then be washed. Washing may be carried out at a pH of from about 7 to about 12, and in embodiments at a pH of from about 9 to about 11. The washing may be at a temperature of from about 30° C. to about 70° C., and in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

Toner particles may possess a CCA, in embodiments a CCA incorporated into a latex, in amounts of from about 0.01 percent by weight to about 10 percent by weight of the toner particles, in embodiments from about 0.1 percent by weight to about 8 percent by weight of the toner particles. As noted above, the toner particles may possess CCA latex in the core, shell, or a combination of both. When in a combination of core and shell, the ratio of CCA latex in the core to the shell may be from about 1:99 to about 99:1, and all combinations in between. In embodiments, toners of the present disclosure possessing a CCA that has been added during the EA process as a dispersion may have a triboelectric charge of from about −2 μC/g to about −60 μC/g, in embodiments from about −10 μC/g to about −40 μC/g. Toners of the present disclosure may also possess a parent toner charge per mass ratio (Q/M) of from about −3 μC/g to about −35 μC/g, and a final toner charging after surface additive blending of from −10 μC/g to about −45 μC/g.

Additives

Further optional additives which may be combined with a toner include any additive to enhance the properties of toner compositions. Included are surface additives, color enhancers, etc. Surface additives that can be added to the toner compositions after washing or drying include, for example, metal salts, metal salts of fatty acids, colloidal silicas, metal oxides, strontium titanates, combinations thereof, and the like, which additives are each usually present in an amount of from about 0.1 to about 10 weight percent of the toner, in embodiments from about 0.5 to about 7 weight percent of the toner. Examples of such additives include, for example, those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. Nos. 6,190,815 and 6,004,714, the disclosures of each of which are hereby incorporated by reference in their entirety, can also be selected in amounts, for example, of from about 0.05 to about 5 percent by weight of the toner, in embodiments from about 0.1 to about 2 percent by weight of the toner. These additives can be added during the aggregation or blended into the formed toner product.

Toner particles produced utilizing a latex of the present disclosure may have a size of about 1 micron to about 20 microns, in embodiments about 2 microns to about 15 microns, in embodiments about 3 microns to about 7 microns. Toner particles of the present disclosure may have a circularity of from about 0.9 to about 0.99, in embodiments from about 0.92 to about 0.98.

Following the methods of the present disclosure, toner particles may be obtained having several advantages compared with conventional toners: (1) increase in the robustness of the particles' triboelectric charging, which reduces toner defects and improves machine performance; (2) easy to implement, no major changes to existing aggregation/coalescence processes; and (3) increase in productivity and reduction in unit manufacturing cost (UMC) by reducing the production time and the need for rework (quality yield improvement).

EXAMPLES

Example 1

Formation of Styrene/n-Butyl Acrylate Latex Doped with "1-Wt % Modified Indigo"

A latex emulsion comprised of polymer particles generated from the emulsion polymerization of styrene, n-butyl acrylate, beta-carboxyethyl acrylate (β-CEA) and modified Indigo was prepared as follows. A surfactant solution of 1.1 grams Dowfax 2A1 (anionic emulsifier; sodium tetrapropyl diphenyloxide disulfonate, 47 percent active, available from Dow Chemical) and 239.5 grams de-ionized water was prepared by mixing for 10 minutes in a stainless steel holding tank. The holding tank was then purged with nitrogen for 5 minutes before transferring into the reactor. The reactor was then continuously purged with nitrogen while being stirred at 450 rpm. The reactor was then heated up to 80° C. at a controlled rate, and held there. Separately, 4.0 grams of ammonium persulfate initiator was dissolved in 38.2 grams of de-ionized water.

Separately, the monomer emulsion was prepared in the following manner. 217 g of styrene, 52.0 g of butyl acrylate, 2.84 modified indigo, 8.1 g of β-CEA, 1.8 g of 1-dodecanethiol, 0.95 g of 1,10-decanediol diacrylate (ADOD), 4.6 g of Dowfax 2A1(anionic surfactant), and 128.3 g of deionized water were mixed to form an emulsion. 1% of the above emulsion was then slowly fed into the reactor containing the aqueous surfactant phase at 80° C. to form the "seeds" while being purged with nitrogen. The initiator solution was then slowly charged into the reactor and after 10 minutes the rest of the emulsion was continuously fed in using a metering pump at a rate of 0.5%/min. Once all the monomer emulsion was charged into the main reactor, the temperature was held at 80° C. for an additional 2 hours to complete the reaction. Full cooling was then applied and the reactor temperature was reduced to 25° C. The product was collected into a holding tank and sieved with a 25 µm screen.

The particle size was then measured by Nanotrac® U2275E particle size analyzer. The color of the latex was similar to a baby/light blue since only 1-wt % of modified Indigo was used. Narrow particle size was achieved with a Particle Size=167.4 nm±0.08 nm.

What is claimed is:

1. A toner comprising toner particles having a shell-core configuration, wherein the core comprises a latex comprising copolymer nanoparticles having a modified colorant dispersed within a matrix of the copolymer nanoparticles, wherein the modified colorant comprises an anionic functional group and a lipophilic counter ion, wherein the modified colorant comprises an indigo selected from indigo, isoindigo, indirubin, isoindirubin, 4,4'-dibromo indigo, 6,6'-dibromo indigo, 5,5'-dibromo indigo, cis-6,6'-dibromo indigo, 5,5',7,7'-tetrabromo indigo, 4,4',7,7'-tetrachloro indigo, 3H-indol-3-one, 1,2-dihydro-2-(3-oxobenzo [b] thien-2-(3H)-ylidene), thioindigo, Vat Red 1, cis-thioindigo, 6,6'-dichloro-4,4'-dimethylindigo, 5,5'-dichloro-7,7'-dimethylindigo, 4,4'-7,7'-tetramethylindigo, 3-(3-oxobenzo[b]thiophen-2(3H)-ylidene)-1H-indol-2(3H)-one (Thioindigo Scarlet R), (E)-3-(3-oxobenzo[b]thiophen-2(3H)-ylidene) indolin-2-one, (Z)-3-(3-oxobenzo[b]thiophen-2(3H)-ylidene)benzo[b]thiophen-2(3H)-one (Thioindirubine), (E)-3-(2-oxobenzo[b]thiophen-3(2H)-ylidene)indolin-2-one, (E)-3-(2-oxobenzo[b]thiophen-3(2H)-ylidene)benzo[b]thiophen-2(3H)-one, Indigo Russig's Blue, 8,8'-dihydroxy-4,4'-dimethoxy-6,6'-dimethyl-2,2'-binaphthylidene-1,1'-quinone (Diosindigo A), 5,5'-dihydroxy-4,4'-dimethoxy-7,7'-dimethyl-2,2'-binaphthylidene-1,1'-quinone (Diosindigo B), 4,4'-diethoxy-2, 2'-binaphtyliden-I, 1'-dione, 4,4'-bis (hexyloxy)-IH, 14H-2.2'-binaphthalene-1, 1'-dione, mamegakinone, biramentaceone, and mixtures thereof.

2. The toner of claim 1, wherein the copolymer nanoparticles comprise polymerized monomers selected from the group consisting of a styrene, an acrylate, a methacrylate, a butadiene, an isoprene, an acrylic acid, a methacrylic acid, an acrylonitrile, and combinations thereof.

3. The toner of claim 1, wherein the shell comprises a latex comprising copolymer nanoparticles having a modified colorant dispersed within a matrix of the copolymer nanoparticles, wherein the modified colorant comprises an anionic functional group and a lipophilic counter ion.

4. The toner of claim 1 further comprising an additive selected from the group consisting of waxes, coagulants, color enhancers, aggregating agents, and mixtures thereof.

5. The toner of claim 4, wherein the additive is present in an amount of from about 0.1 to about 10 weight percent of the toner.

6. The toner of claim 1, wherein the toner particles have a diameter in a range of from about 1 micron to about 20 microns.

7. The toner of claim 1, wherein the toner particles have a circularity of from about 0.9 to about 0.99.

* * * * *